(12) United States Patent  
Lemieux

(10) Patent No.: US 7,686,379 B2  
(45) Date of Patent: Mar. 30, 2010

(54) REMOVABLE DOOR SKIN

(75) Inventor: Robert Lemieux, Guelph (CA)

(73) Assignee: GMA Cover Corp., Guelph, ON (CA)

( * ) Notice: Subject to any disclaimer, the term of this patent is extended or adjusted under 35 U.S.C. 154(b) by 1137 days.

(21) Appl. No.: 11/294,601

(22) Filed: Dec. 6, 2005

(65) Prior Publication Data

US 2006/0181102 A1 Aug. 17, 2006

(51) Int. Cl.
*B60J 5/04* (2006.01)
(52) U.S. Cl. ..................................................... 296/148
(58) Field of Classification Search ............. 296/146.1, 296/147, 148, 152, 153, 154, 146.5, 146.7, 296/146.9; 89/36.01, 36.07–36.09
See application file for complete search history.

(56) References Cited

U.S. PATENT DOCUMENTS

| 2,620,224 | A | * | 12/1952 | Hedley | 296/148 |
| 3,055,700 | A | * | 9/1962 | Helmut | 296/148 |
| 3,855,898 | A | * | 12/1974 | McDonald | 89/36.08 |
| 4,070,056 | A | | 1/1978 | Hickman | |
| 4,220,298 | A | * | 9/1980 | Willis | 244/129.5 |
| 4,352,316 | A | * | 10/1982 | Medlin | 89/36.02 |
| 4,644,699 | A | | 2/1987 | Chandler et al. | |
| 4,733,902 | A | * | 3/1988 | Rabb | 296/39.3 |
| 5,180,880 | A | * | 1/1993 | Zufle | 89/36.02 |
| 5,377,577 | A | * | 1/1995 | Bounkong et al. | 89/36.05 |
| 5,438,908 | A | * | 8/1995 | Madden, Jr. | 89/36.08 |
| 5,531,500 | A | | 7/1996 | Podvin | |
| 5,806,906 | A | * | 9/1998 | Hammond | 296/26.01 |
| 6,036,255 | A | * | 3/2000 | Lester et al. | 296/146.1 |
| 6,036,256 | A | * | 3/2000 | Hilliard et al. | 296/148 |
| 6,073,989 | A | | 6/2000 | Hilliard et al. | |
| 6,547,304 | B1 | * | 4/2003 | Conner et al. | 296/79 |
| 6,773,054 | B2 | | 8/2004 | Martini | |

* cited by examiner

*Primary Examiner*—Glenn Dayoan
*Assistant Examiner*—Gregory Blankenship
(74) *Attorney, Agent, or Firm*—Miller Thomson LLP

(57) ABSTRACT

A removable door skin for a vehicle for mounting on a door frame member and includes a flexible door panel that includes an edge and a flap. The flexible door panel may further include a fastening means having a first portion and a second portion wherein the first portion is located on the flexible door panel and second portion is located on the flap.

18 Claims, 13 Drawing Sheets

REMOVABLE DOOR SKIN

FIELD OF THE INVENTION

This invention relates in general to vehicle doors and more particularly to a removable or replaceable door skin or panel for a vehicle door frame member or support.

BACKGROUND OF THE INVENTION

Utility vehicles often comprise of an open body arrangement that include a fabric top and removable doors. This arrangement may be seen in light sport utility vehicles, heavy sport utility vehicles, light trucks, or large earth moving machines by way of example. The ability to remove the top or the doors increases the flexibility of the vehicle, however the ease in which one can remove the top or the doors is also important so as to improve the function and use of the vehicle by the user.

Prior art door panels have been devised to address some of the aforenoted issues. For example, U.S. Pat. No. 4,070,056 issued on Jan. 24, 1978 to Hickman, and relates to a utility vehicle such as an open vehicle provided with a fabric top, in which the windshield forms the upper portion of the forward upright of the door frame and portions of the top form the lintel and at least part of the rear upright. The door comprises a skeletal framework having a border structure conforming to the shape of the door frame and covered with fabric, the framework being made of resilient material. The door is hung on the existing hinge mounts and its lower portion lies in a vertical plane corresponding to that of the lower portion of the door frame. When the door is closed the upper end of the sealing rib and continued movement to complete closure springs the upper part of the door so that it fits tightly against the rib and lintel and produces a weather tight seal.

U.S. Pat. No. 4,644,699 which issued on Feb. 24, 1987 to Chandler et al. relates to utility vehicle such as an open vehicle having an open top such as a Jeep type vehicle or a large earth moving machine. To provide an enclosed operator's compartment it has been necessary to use steel or fabric door closures that makes use of space age plastics and uses the high impact characteristics along with the transparency of these materials to provide a strong yet safe door closing allowing the operator to have full vision from the door of the operator's station.

U.S. Pat. No. 6,073,989 which issued on Jun. 13, 2000 to Hilliard et al. relates to a removable door frame assembly for a motor vehicle includes a first portion pivotally interconnected to a second portion. The first portion is adapted to be oriented horizontally and releasably attached to a sport bar assembly of the motor vehicle. The second portion is adapted to be oriented vertically and releasably engage the body of the vehicle. The first portion is configured to releasably retain a retaining element attached to a top section of the soft top and thereby retain the soft top in a cross-car direction. Similarly, the second portion is adapted to releasably retain a retaining element attached to a side section of the soft top and longitudinally retain the side section.

U.S. Pat. No. 6,773,054 which issued on Aug. 10, 2004 to Martini relates to an open mesh vehicle door comprising a substantially rigid frame member, having at least one pin to pivotally affix said door to a vehicle at a first end and having a latch at a second end, further having an open mesh webbing being attached between at least two opposing sides of the frame member.

The prior art however does not address a removable door panel or skin for a utility vehicle door frame member or support. Therefore a removable door skin or panel which can be easily removed and replaced with another door skin or panel by either removing the door support from the vehicle or by leaving the door support or frame in place is desirable.

SUMMARY OF THE INVENTION

An object of one aspect of the present invention is to provide an improved removable door skin for a vehicle door frame member or support.

In accordance with one aspect of the present invention there is provided a removable door skin for a vehicle door frame member or support including a flexible door panel that includes an edge and a flap. The flexible door panel may further include a fastening means having a first portion and a second portion wherein the first portion is located on the flexible door panel and second portion is located on the flap.

Conveniently, the removable door skin may further include an extruded seal at the edge of the flexible door panel thereby acting as a hinge point for wrapping the flap around the door frame member. The seal will aid in protecting the interior of the vehicle against inclement weather. Furthermore an attachment zone on the inside of the flexible panel may accommodate additional panels on the inside of the vehicle such as a ballistic panel or storage panel.

Preferably, the removable door skin and specifically the flexible door panel may be in different colours to adapt the removable door skin and therefore the vehicle to different environments such as woodland, desert, urban or artic or military environment by way of example only.

Advantages of the present invention are: allows for the exterior surface or panel of a door assembly to be removed and replaced without having the expense of replacing the entire door assembly; the replaceable door skin can be in any colour or pattern thereby adapting the outside of the vehicle and specifically the door to different environments; the removable door skin may be reversible having an alternative colour on the other side of the flexible panel; the replaceable door skin allows for very quick replacement of the door skin; allows for the reuse of all the bolt-in components as well as the door support or frame; the replaceable door skin can have any environment on it or any colour and therefore the vehicle's signature or colour can be easily and cost effectively changed and managed; reduction of inventory and cost as complete door assemblies are not required and only the removable door skins are in inventory; a weather seal may be added to protect the interior of the vehicle from the elements; installation and de-installation of the removable door skin does not alter the appearance or performance of the door support or frame and bolt-on components; easy installation using a fastening means such as fastener hook and loop; fastening means allows for the removable door skin to be tensioned on to the door frame; an additional attachment means or point on the interior side of the panel allows for an additional panel to be on the inside of the vehicle to accommodate storage or a ballistic panel.

BRIEF DESCRIPTION OF THE DRAWINGS

A detailed description of the preferred embodiments is provided herein below by way of example only and with reference to the following drawings, in which.

Figure 1:
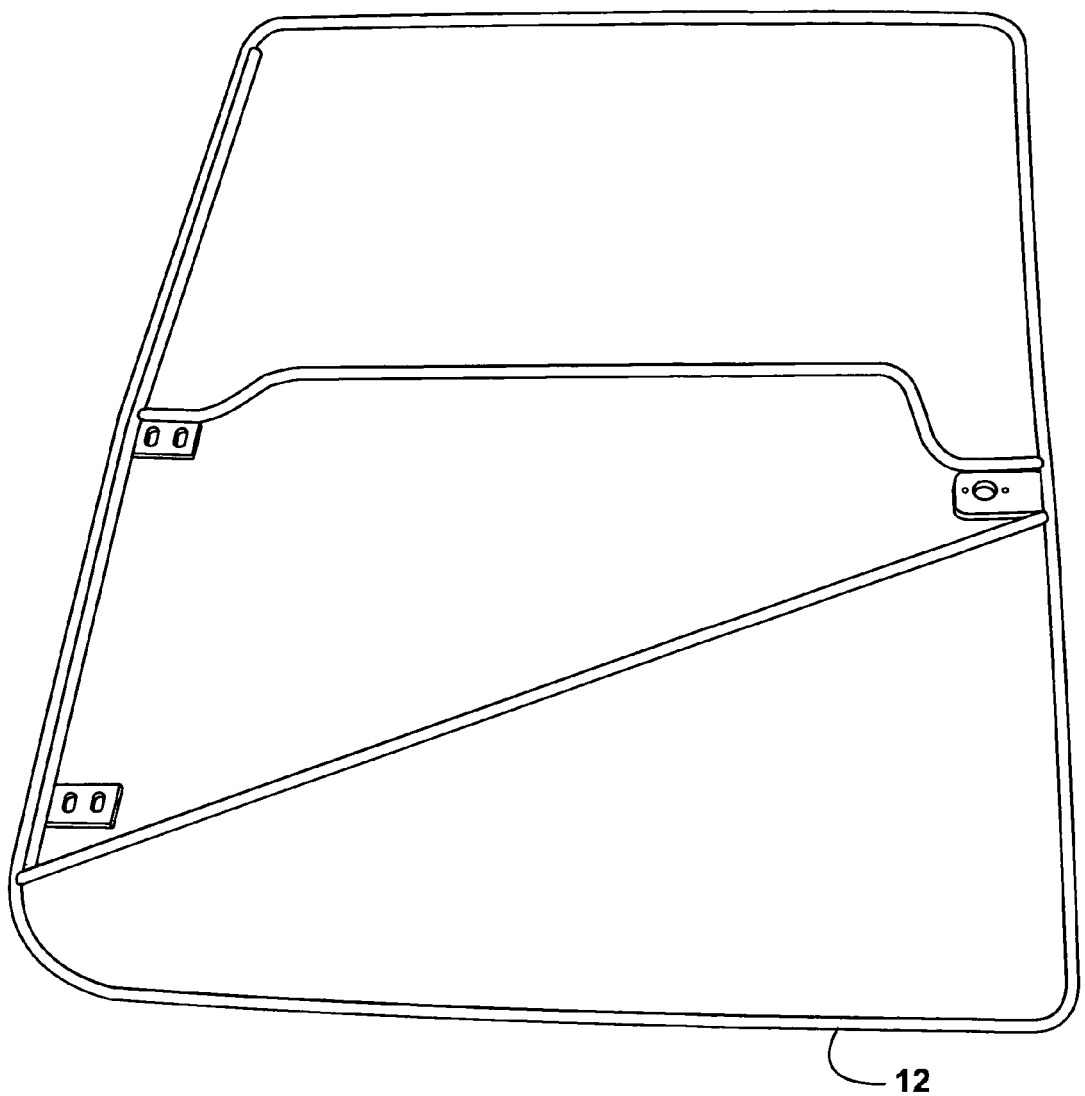
FIG. 1 in a photographic perspective view, illustrates a door frame member in accordance with the preferred embodiment of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 3:
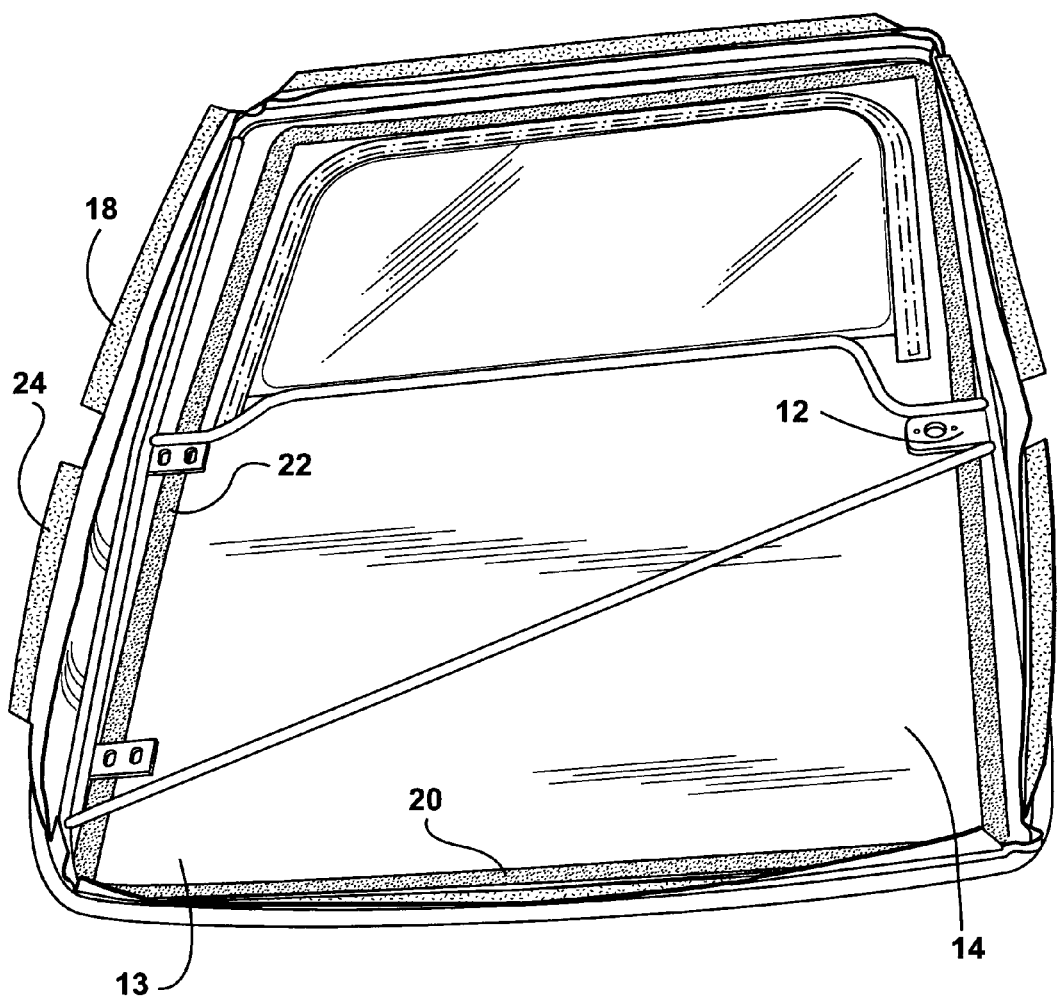
FIG. 3 in a photographic perspective view, illustrates the door frame member inserted into the replaceable door skin.
Figure 11:
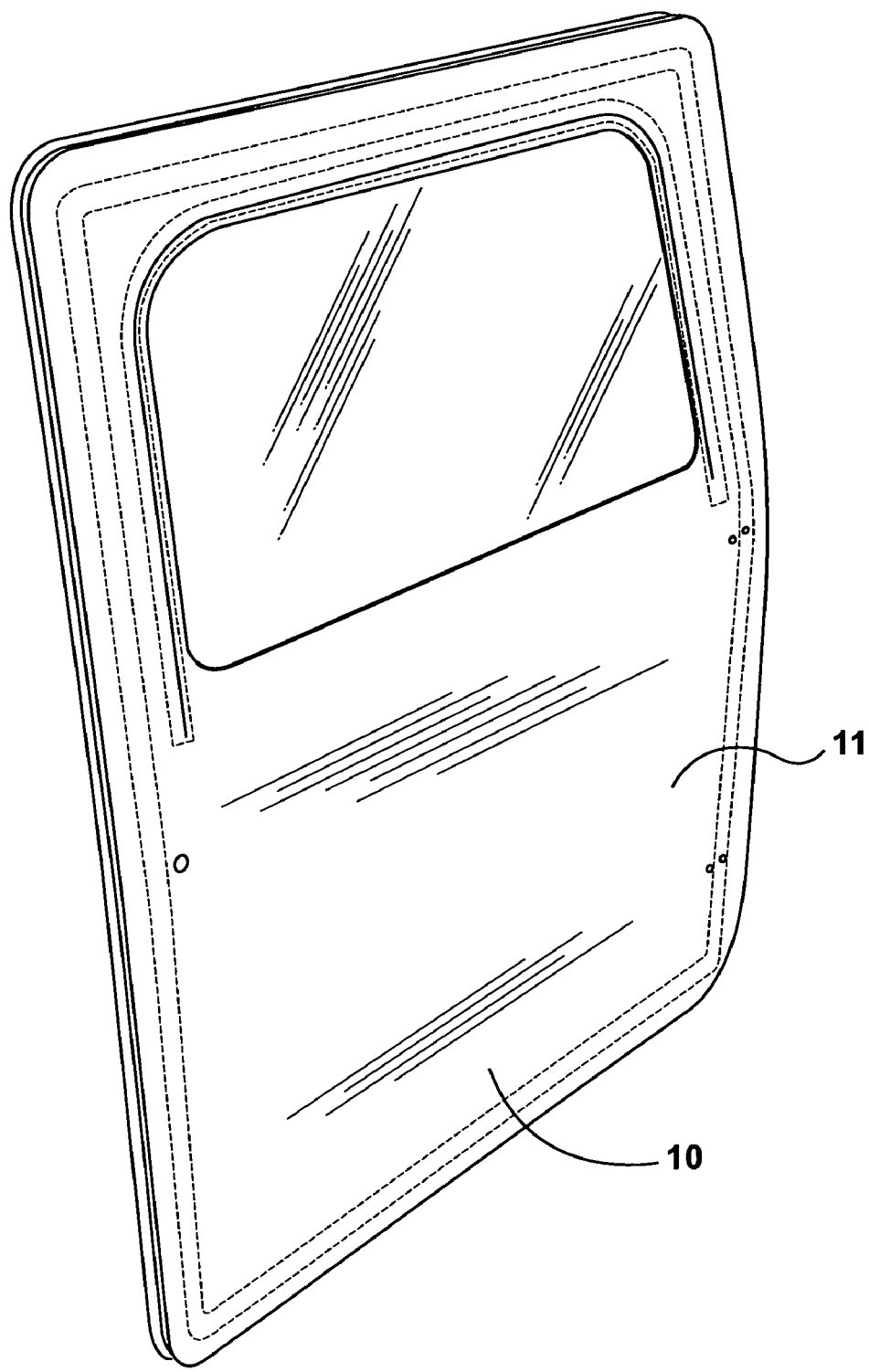
FIG. 11 in a photographic front perspective view, illustrates the assembled replaceable door skin on the door frame member.
Figure 12:
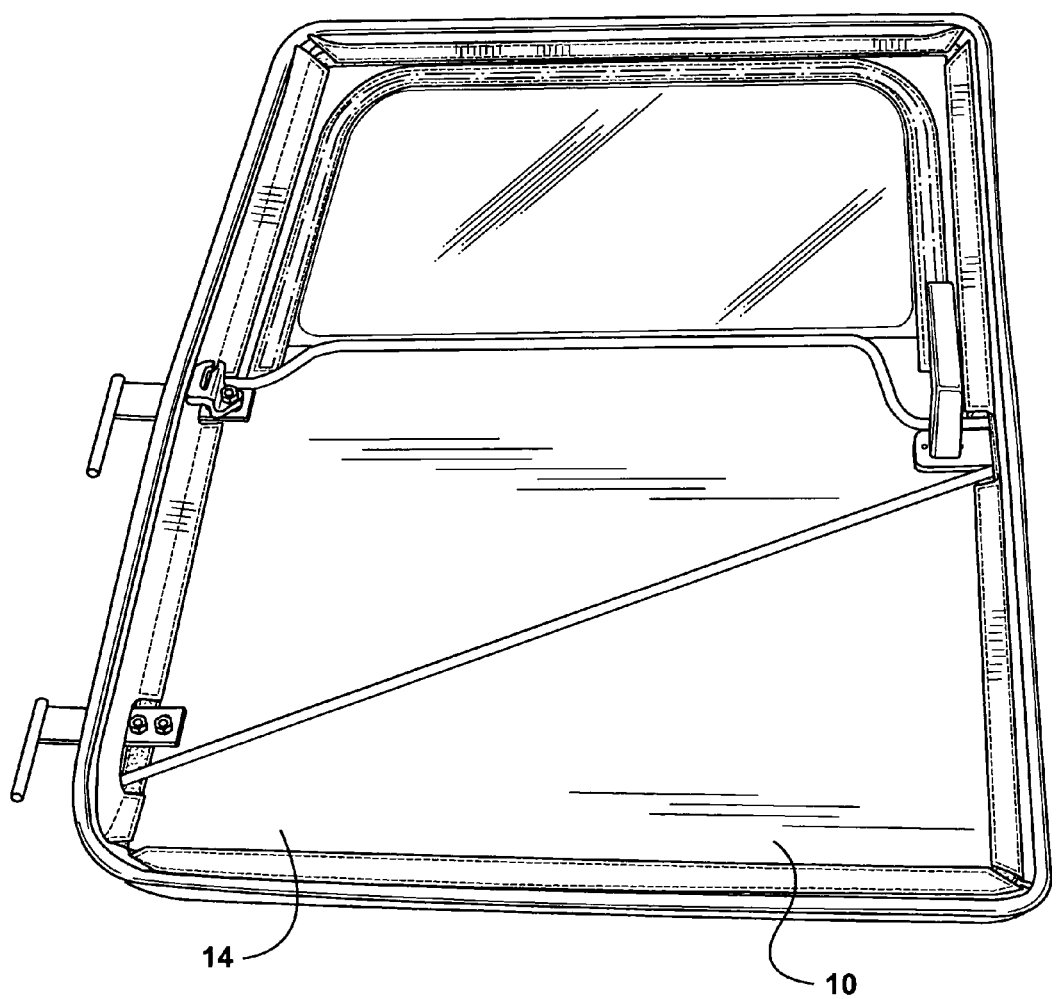
FIG. 12 in a photographic front perspective view, illustrates the assembled replaceable door skin on the door frame member.
Figure 13:
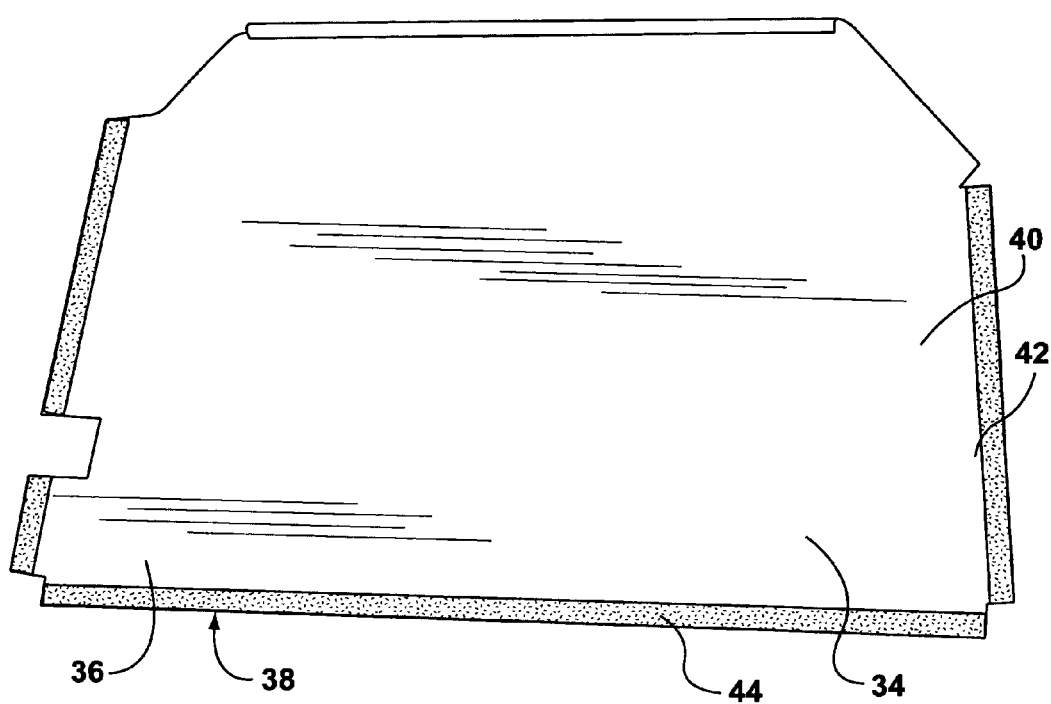
FIG. 13 in a photographic front perspective view, illustrates the separate ballistic panel.
Figure 14:
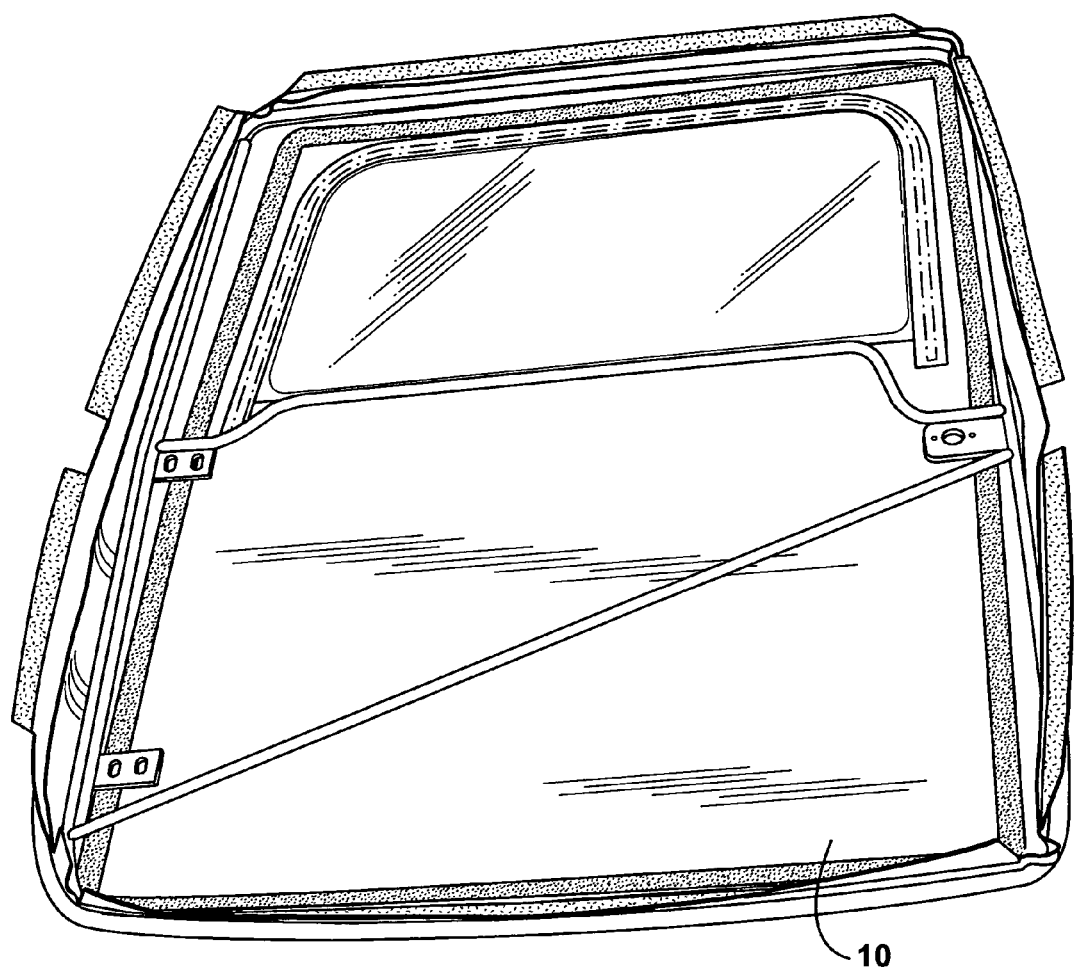
FIG. 14 in a photographic back perspective view, illustrates the disassembled replaceable door skin and the door frame member.
Figure 15:
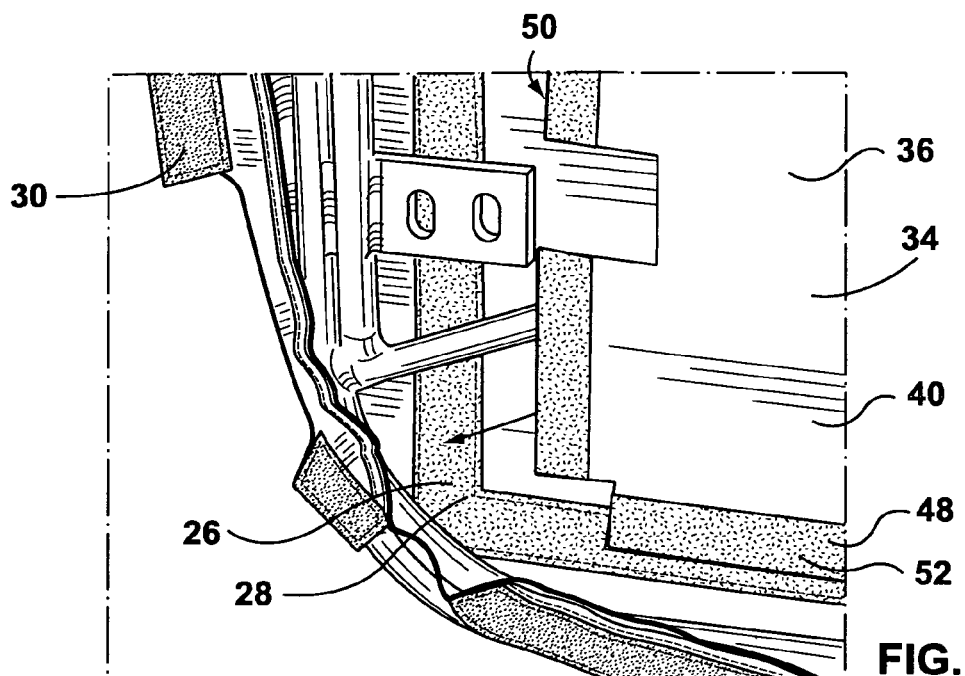
FIG. 15 in a photographic back perspective view, illustrates the disassembled replaceable door skin on the door frame member.
Figure 16:
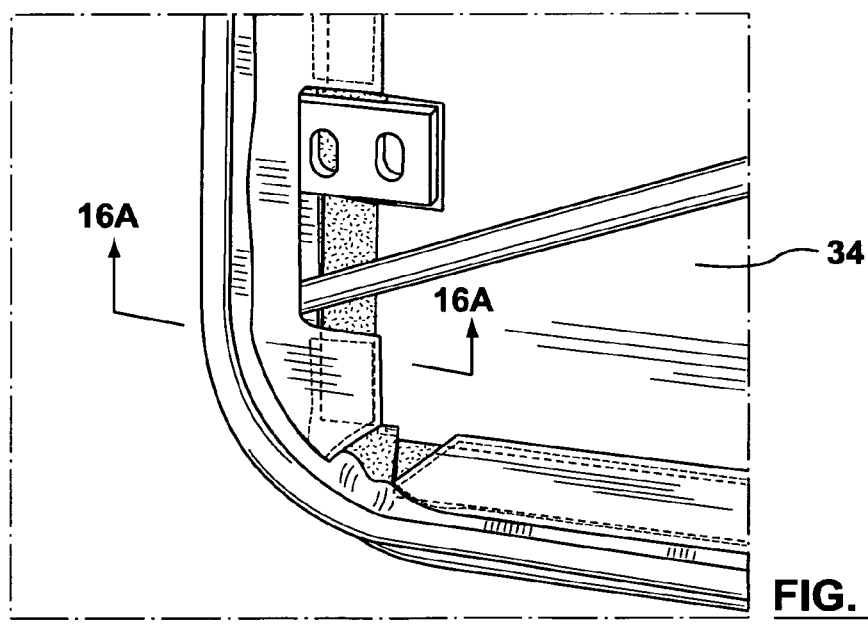
FIG. 16 in a photographic back perspective view, illustrates the positioning and securing of ballistic panel to replaceable door skin on the door frame member.
Figure 16A:
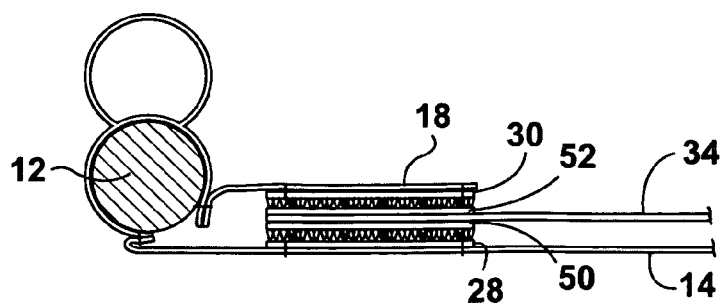
Figure 17:
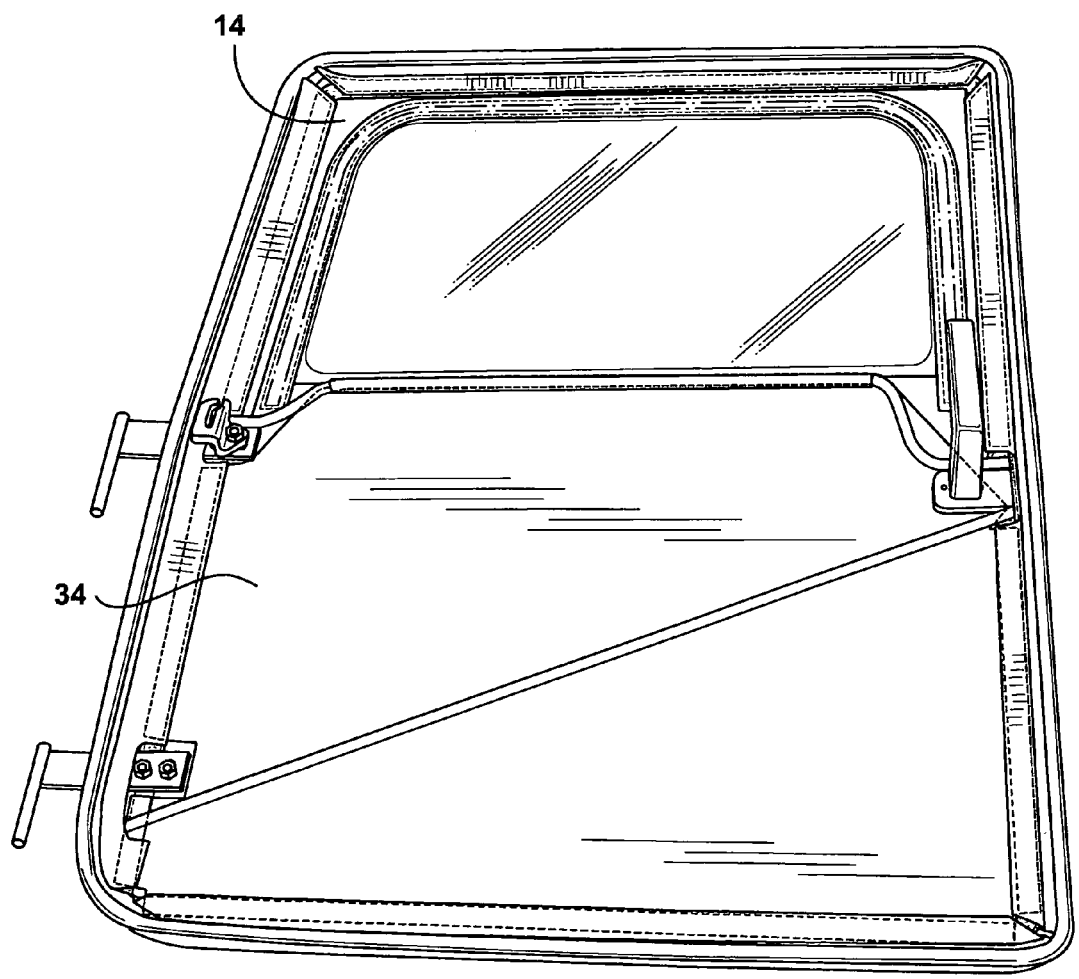
FIG. 17 in a photographic back perspective view, illustrates the assembled replaceable door skin with the ballistic panel on the door frame member.

Referring to FIG. 3, there is illustrated in a photographic view, a removable door skin 10 for a vehicle door frame member 12 in accordance with a preferred embodiment of the present invention. The removable door skin 10 includes a flexible door panel 14 that includes a first side 11 (as seen in FIG. 11), a second side 13, an edge 16 and a flap 18. The first side 11 is typically on the outside of the vehicle, and the second side 13 is typically on the inside of the vehicle.

Figure 2:
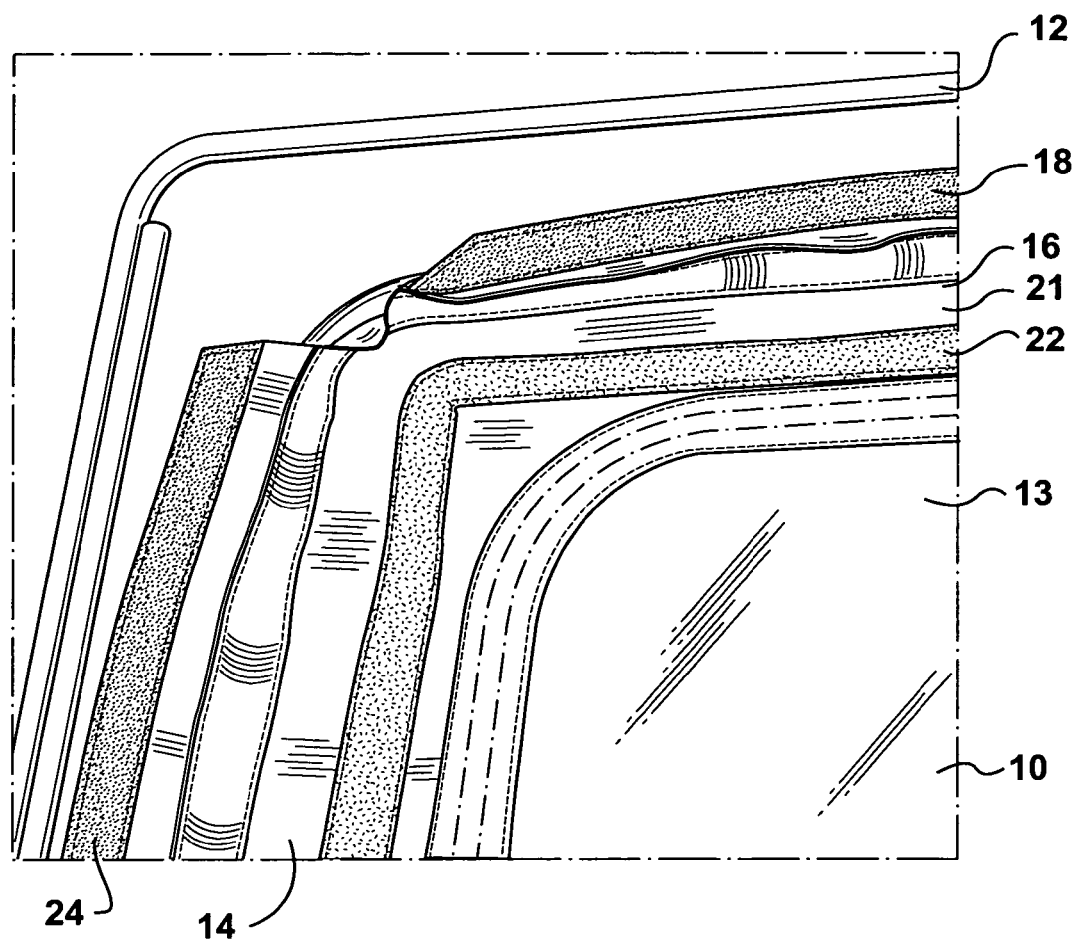
FIG. 2 in a photographic perspective view, illustrates the door frame member and the replaceable door skin.

Referring to FIG. 2 the flexible door panel 14 may further include a fastening means 20 located on the second side 13. The fastening means 20 may be further defined as having a first portion 22 and a second portion 24 wherein the first portion 22 may be mounted to the flexible door panel 14 and second portion 24 may be mounted on the flap 18. More specifically the flexible door panel 14 may have an outer periphery 21. The first portion 22 of the fastening means 20 is then mounted to the second side 13 at the outer periphery 21 of the flexible door panel 14. The second portion 22 may be mounted to the second side 13 of the flap 18.

Figure 4:
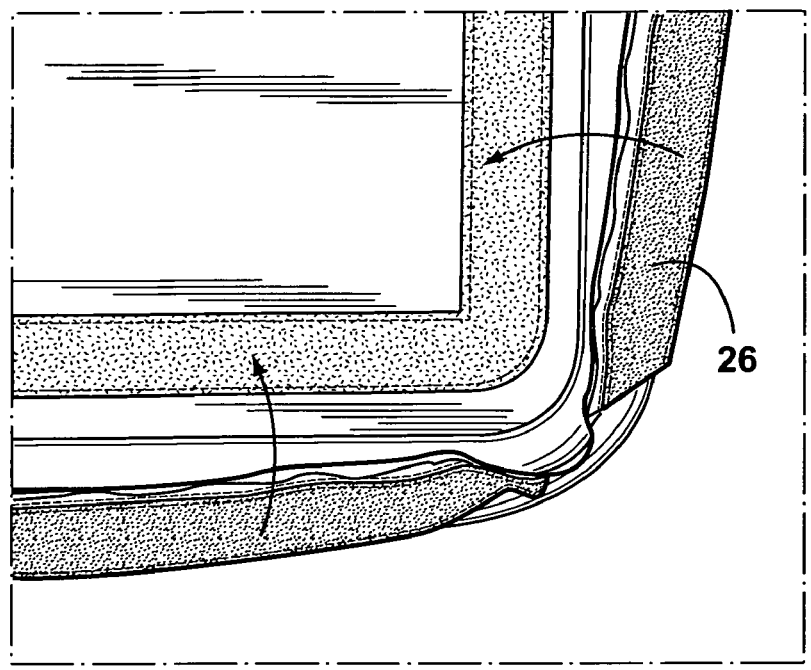
FIG. 4 in a photographic perspective view, illustrates a corner of the partially assembled door skin and door frame member of FIG. 3.
Figure 5:
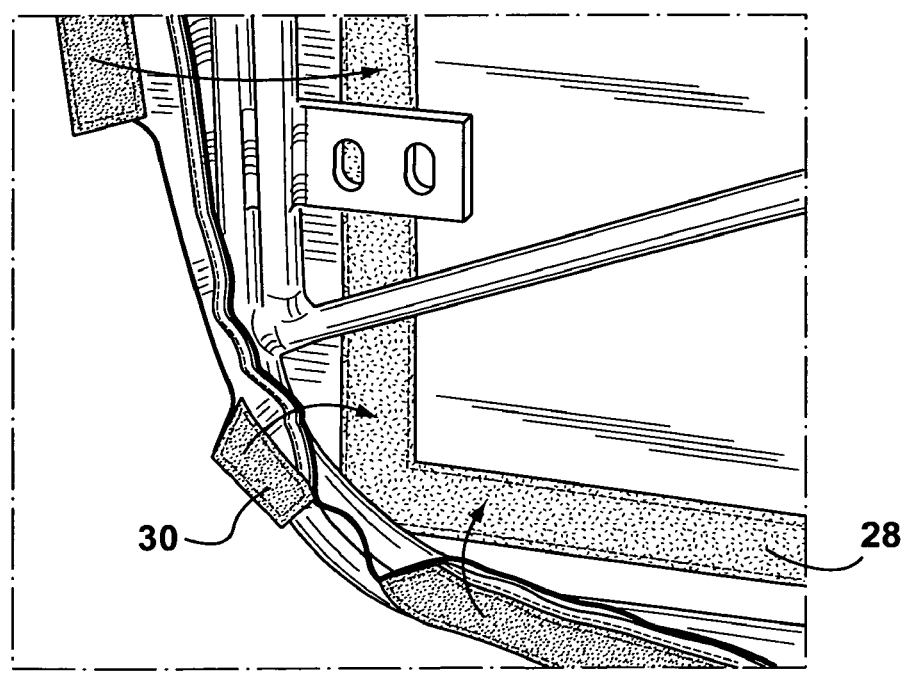
FIG. 5 in a photographic perspective view, illustrates a corner of the partially assembled door skin and door frame member of FIG. 3.
Figure 6:
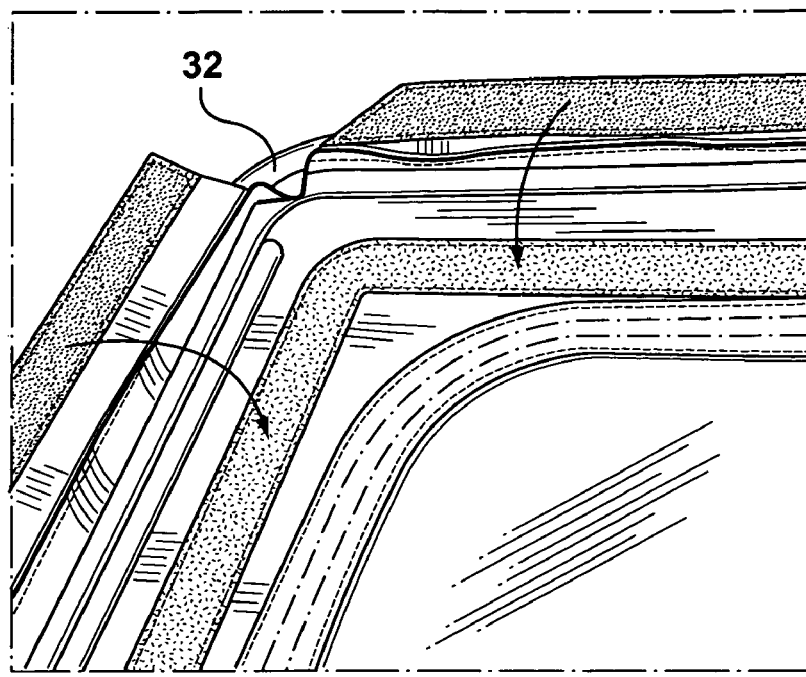
FIG. 6 in a photographic perspective view, illustrates a corner of the partially assembled door skin and door frame member of FIG. 3.
Figure 7:
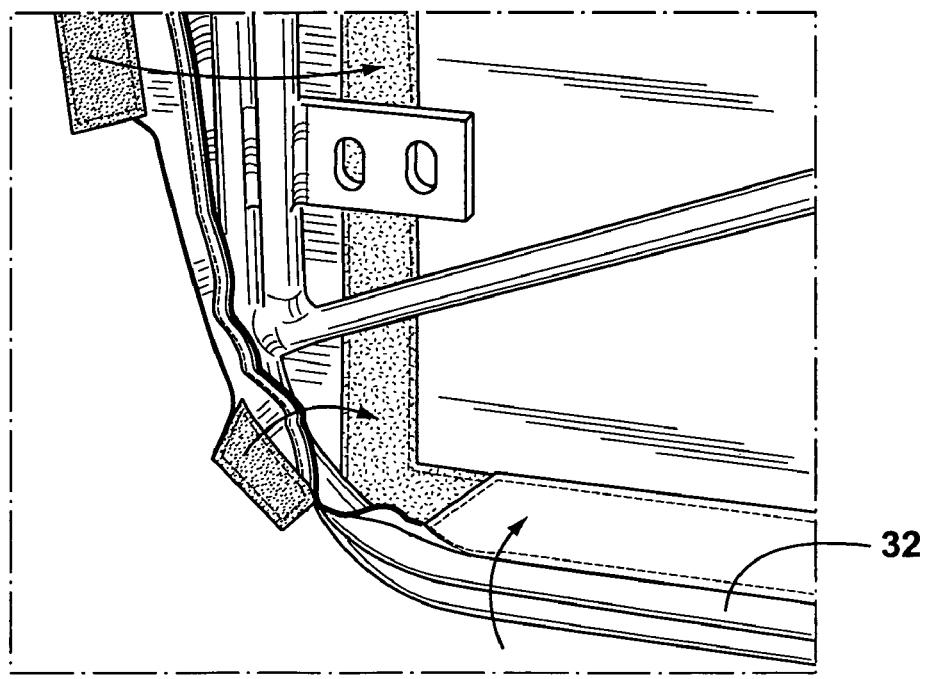
FIG. 7 in a photographic perspective view, illustrates a corner of the partially assembled door skin and door frame member of FIG. 3.
Figure 8:
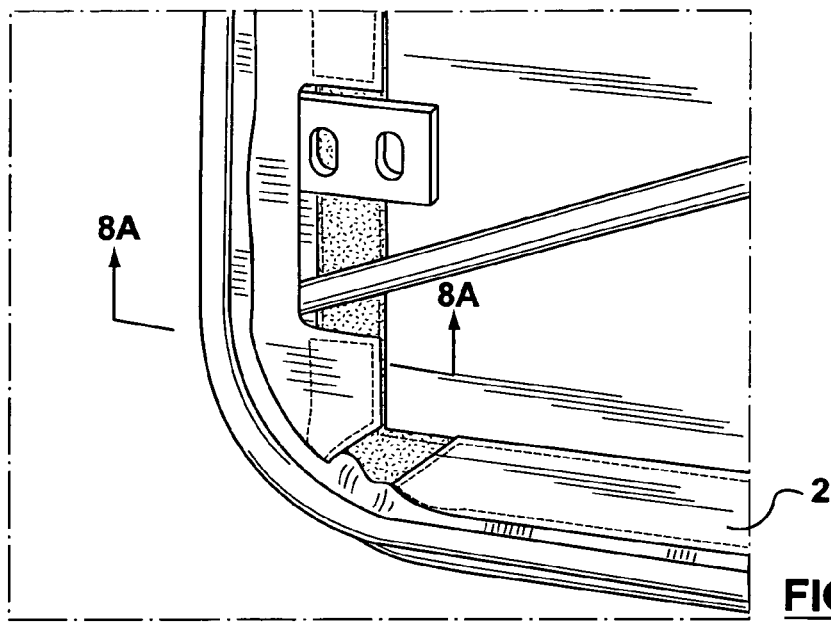
FIG. 8 in a photographic perspective view, illustrates a corner of the assembled door skin and door frame member of FIG. 3.
Figure 8A:
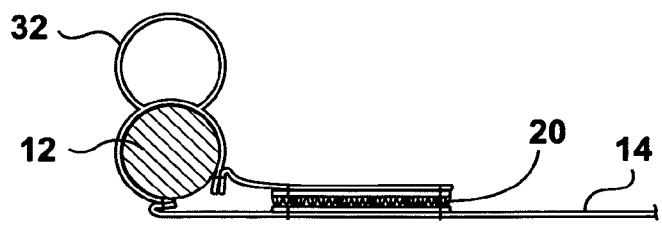
Figure 9:
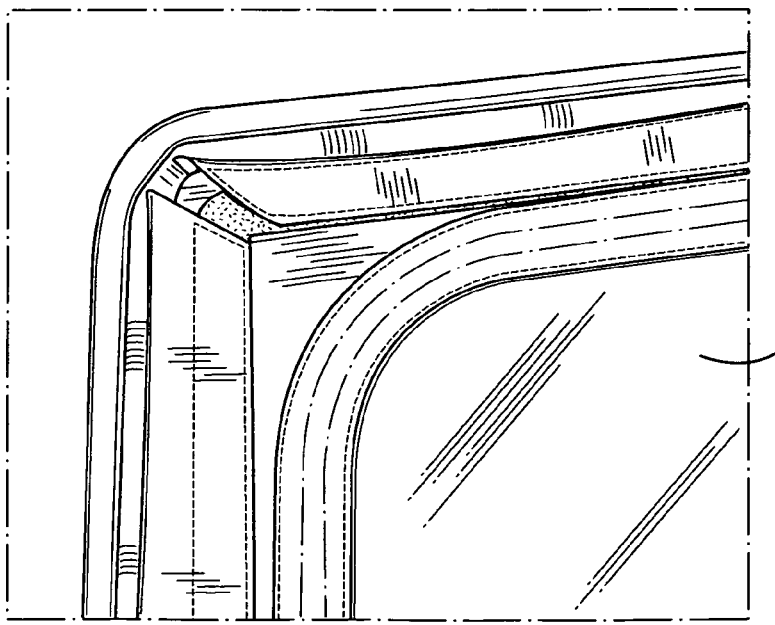
FIG. 9 in a photographic perspective view, illustrates a corner of the assembled door skin and door frame member of FIG. 3.
Figure 10:
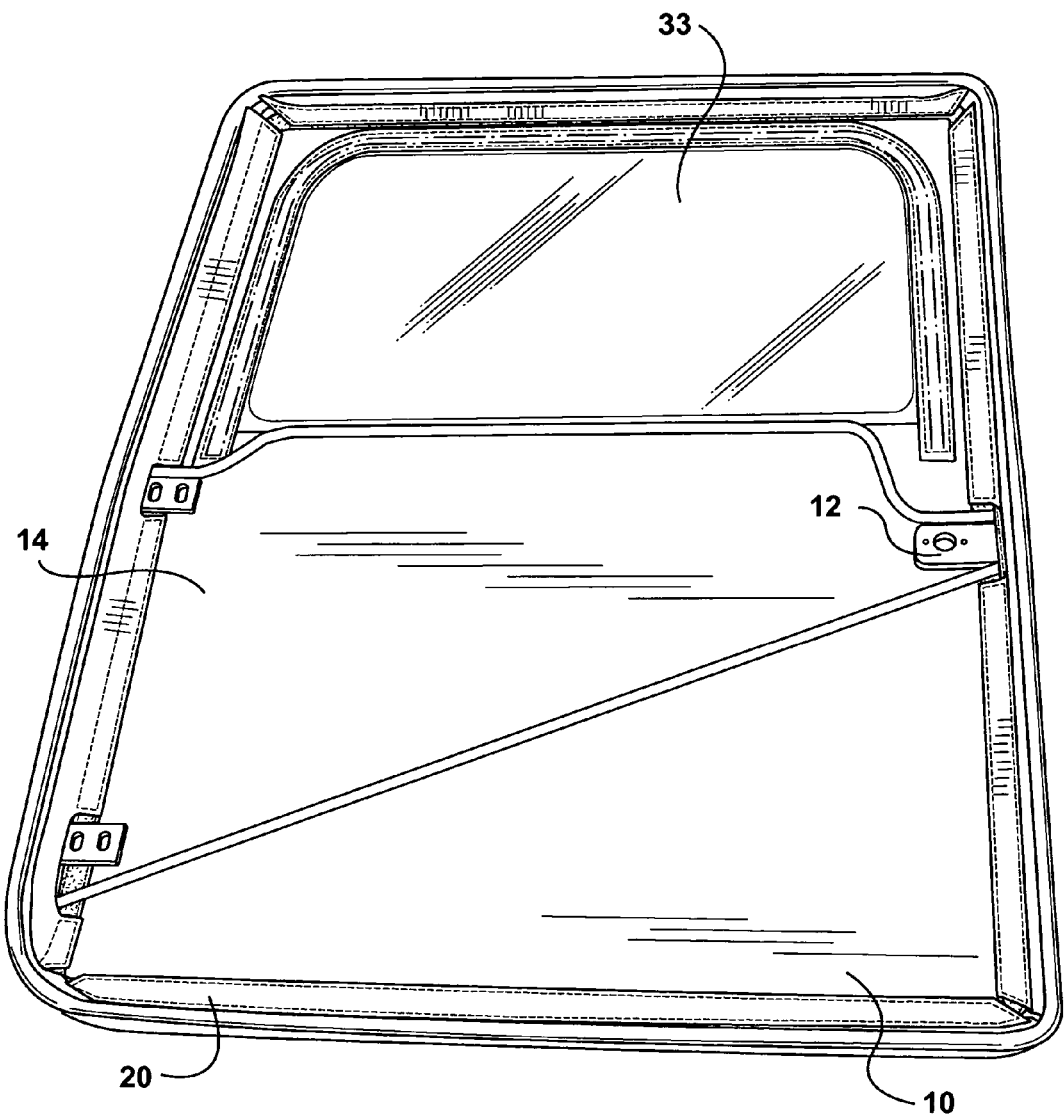
FIG. 10 in a photographic back perspective view, illustrates the assembled replaceable door skin on the door frame member.

Both the first portion 22 and the second portion 24 of the fastening means 20 may be adapted to engage one another to fasten to one another. More specifically the fastening means 20 may be further defined as fastener hook and loop tape 26 as seen in FIGS. 4 and 5, wherein a loop portion 28 is mounted to the flexible door panel 14 and a hook portion 30 is mounted to the flap 18. The engagement of the loop portion 28 to the hook portion 30 results in an interlocking or fastening to one another. The relationship and positioning of the loop portion 28 and the hook portion 30 may be reversed. The fastening means 20 may be secured to the flexible door panel 14 using a variety of methods such as welding, adhesion means or sewing by way of example only. Upon the engagement of the fastening means 20, the flexible door panel 14 is then secured to the door frame member 12 as seen in FIG. 10, Referring to FIGS. 6 to 8 the flexible door panel 14 may further include a seal 32 mounted at the edge 16 of the flexible door panel 14. The seal 32 may then have mounted on its other edge the flap 18 having the second portion 24 of the fastening means 20. In this configuration the seal 32 may act as a hinge point where the flexible door panel 14 wraps around the door frame member 12. The seal 32 may be a continuous extrusion out of rubber or other similar material that provides a weather seal between the vehicle itself and door panel. Furthermore the flexible door panel 14 may include a flexible window 33 or other see through mechanism that provides for viewing outside of the vehicle as seen in FIG. 9. Finally the flexible door panel 14 can be utilized in other environments besides vehicles namely anywhere there is a door support or frame 12. Furthermore the first side 11 of the flexible door panel 14 that faces outward from the vehicle may be a variety of colours that form a pattern such as a typical camouflage pattern or may also be a colour that matches the environment that the vehicle is in, such as woodland, desert, or artic by way of example.

Referring to FIGS. 12 to 17, the removable door skin 10 may further have the ability of attaching an additional panel 34 on the second side 13 of the flexible door panel 14. For example a ballistic panel 36 shaped to fit the flexible door panel 14 may have a first side 38, a second side 40, and an outer edge 42. A fastening means 44 may be mounted at the outer edge 42 of both the first and second sides 40 and 42.

More specifically the fastening means 44 may be further defined as fastener hook and loop tape 48. The positioning of the hook and loop tape 48 on the ballistic panel 36 will depend on the positioning of the hook and loop tape 26 on the flexible door panel 14. Specifically if the loop portion 28 is mounted to the flexible door panel 14 and the hook portion 30 is mounted to the flap 18, then a hook portion 50 is mounted on the first side of the ballistic panel 36 to engage the loop portion 28 of the flexible door panel 14, and the loop portion 52 is mounted on the second side of the ballistic panel 36 to engage the hook portion 30 on the flap 18. The positioning of the hook and loop portions may be reversed. Other types of additional panels 34 include a storage panel and the like.

In operation, the removable door skin 10 may be mounted and secured on the door frame or support 12. How this is achieved is explained here below with reference to FIGS. 2 to 11. The door frame 12 may be mounted already to a vehicle. The removable door skin 10 may be installed while the door frame 12 remains on the vehicle or the door frame 12 may be removed from the vehicle. In FIGS. 2 to 11 the door frame 12 is positioned on a flat surface to show the mounting and securing of the removable door skin 10. The flexible door panel 14 is positioned so that the first side 11 will be on the outside of the vehicle and the second side 13 is facing on to the inside of the vehicle. The door frame 12 is positioned on the flexible door panel 14 and positioned into the edge 16. Therefore the flap 18 wraps around the door frame or support 12. If a weather seal 32 is included the weather seal 32 acts as a hinge point where the flap 18 wraps around the door frame 12. The positioning of the door frame 12 in relation to the flexible door panel 14 allows for the positioning and engagement of the first portion 22 and the second portion 24 of the fastening means 20 to one another.

The application of slight pressure of the flap 18 to the flexible door panel 14 results in the securing of the fastening means. At this juncture the door frame or support 12 is secured in between the flap 18 and the flexible door panel 14. The removable door skin 10 may be tensioned around the door frame 12 thereby ensuring the removable door skin 10 is securely in place.

In operation, an additional panel 34 may be mounted to the removable door skin 10 and therefore the door frame or support 12. How this is achieved is explained here below with reference to FIGS. 12 to 17. The additional panel 34 such as the ballistic panel 36 may be mounted to the second side 13 of the flexible door panel 14 similar to the method described above. After the positioning of the door frame 12 to the flexible door panel 14, the ballistic panel 36 may be positioned to match the shape of the flexible door panel 14. The fastening means 44 of the ballistic panel 36 on its first side 38 may engage the fastening means 20 on the second side 13 of the flexible door panel 14 and then the flap 18 may be secured to the second side 40 of the ballistic panel 36 by the fastening means 20.

Other variations and modifications of the invention are possible. All such modifications or variations are believed to be within the sphere and scope of the invention as defined by the claims appended hereto.

The invention claimed is:

1. A removable door skin for a vehicle door frame member comprising:
    (a) a flexible panel having a first side, a second side having an edge having an outer periphery and a flap portion, the flexible panel further includes a seal integrally connected between the outer periphery of the edge and the flap wherein the seal is a hinge; and
    (b) a fastening means having a first portion adapted to engage the edge and the outer periphery of the second side of the flexible panel and a second portion adapted to engage the flap;
wherein the first portion of the fastening means and the second portion of the fastening means are adapted to engaged one another.

2. A removable door skin for a vehicle door frame member as claimed in claim 1 wherein the seal is extruded rubber providing a weather seal.

3. A removable door skin for a vehicle door frame member as claimed in claim 1 wherein the fastening means is a fastener hook and loop tape.

4. A removable door skin for a vehicle door frame member as claimed in claim 3 wherein the fastener hook and loop tape comprises a loop portion mounted to outer periphery of the second side and a hook portion mounted to the flap.

5. A removable door skin for a vehicle door frame member as claimed in claim 4 wherein the fastener hook and loop tape is a tensioning mechanism to secure the removable door skin to the vehicle door frame.

6. A removable door skin for a vehicle door frame member as claimed in claim 5 wherein the loop portion is mounted to the flap and the hook portion is mounted to the outer periphery.

7. A removable door skin for a vehicle door frame member as claimed in claim 6 wherein fastener hook and loop tape is mounted to the flexible panel by welding, adhesion means or sewing.

8. A removable door skin for a vehicle door frame member as claimed in claim 1 further comprising a see-through mechanism mounted into the flexible panel.

9. A removable door skin for a vehicle door frame member as claimed in claim 8 wherein the see-through mechanism is a window.

10. A removable door skin for a vehicle door frame member as claimed in claim 1 further comprising an additional panel sized to fit next to flexible panel.

11. A removable door skin for a vehicle door frame member as claimed in claim 10 wherein the additional panel has a first side, a second side, an outer edge, and a fastening means having a first portion mounted to the outer edge of the first side and a second portion mounted to the outer edge of the second side.

12. A removable door skin for a vehicle door frame member as claimed in claim 11 wherein the fastening means is a fastener hook and loop tape.

13. A removable door skin for a vehicle door frame member as claimed in claim 12 wherein the fastener hook and loop tape is positioned on the first and second sides of the additional panel so as to engage the fastening means on the flexible panel.

14. A removable door skin for a vehicle door frame member as claimed in claim 13 wherein the additional panel is reversible.

15. A removable door skin for a vehicle door frame member as claimed in claim 14 wherein the additional panel is a ballistic panel.

16. A removable door skin for a vehicle door frame member as claimed in claim 15 wherein the additional panel is a storage panel.

17. A removable door skin for a vehicle door frame member as claimed in claim 16 wherein the first side of the flexible panel faces outwards from the vehicle and is camouflage pattern, a woodland pattern, a desert pattern, or an attic pattern.

18. A removable door skin for a vehicle door frame member as claimed in claim 17 wherein the flexible panel is removable from the vehicle door frame and replaced without having to replace the vehicle door frame member.

* * * * *